US012749948B2

(12) United States Patent
Enzendorfer et al.

(10) Patent No.: US 12,749,948 B2
(45) Date of Patent: Sep. 29, 2026

(54) ELECTRIC TRACTION MACHINE FOR A MOTOR VEHICLE

(71) Applicant: Bayerische Motoren Werke Aktiengesellschaft, Munich (DE)

(72) Inventors: Thomas Enzendorfer, Steyr (AT); Thomas Geiger, Gaspoltshofen (AT); Rainer Schoenegger, Weyer (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 212 days.

(21) Appl. No.: 18/841,517

(22) PCT Filed: Apr. 21, 2023

(86) PCT No.: PCT/EP2023/060389
§ 371 (c)(1),
(2) Date: Aug. 26, 2024

(87) PCT Pub. No.: WO2023/213561
PCT Pub. Date: Nov. 9, 2023

(65) Prior Publication Data

US 2025/0175059 A1 May 29, 2025

(30) Foreign Application Priority Data

May 3, 2022 (DE) ..................... 10 2022 110 820.1

(51) Int. Cl.
*H02K 9/19* (2006.01)
*H02K 5/20* (2006.01)
(Continued)

(52) U.S. Cl.
CPC ............. *H02K 9/197* (2013.01); *H02K 5/203* (2021.01); *H02K 9/193* (2013.01)

(58) Field of Classification Search
CPC .......... H02K 9/197; H02K 9/19; H02K 5/203; H02K 9/193
See application file for complete search history.

(56) References Cited

U.S. PATENT DOCUMENTS

| | | | | |
|---|---|---|---|---|
| 10,770,949 | B2 * | 9/2020 | Scharlach | H02K 5/203 |
| 2009/0267426 | A1 | 10/2009 | Graner et al. | |

(Continued)

FOREIGN PATENT DOCUMENTS

| | | | |
|---|---|---|---|
| EP | 2 975 734 | B1 | 5/2020 |
| EP | 2 109 207 | B1 | 7/2020 |

(Continued)

OTHER PUBLICATIONS

International Search Report (PCT/ISA/210) issued in PCT Application No. PCT/EP2023/060389 dated Jul. 17, 2023 with English translation (5 pages).

(Continued)

*Primary Examiner* — Leda T Pham
(74) *Attorney, Agent, or Firm* — Crowell & Moring LLP

(57) ABSTRACT

An electric traction machine for a motor vehicle includes a rotor, a stator, a stator sleeve into which the stator is pressed, and a housing. The housing, together with which the stator sleeve, delimits at least one pressurized oil cooling channel and at least one water cooling channel, wherein an equalization chamber is kept free axially between the at least one pressurized oil cooling channel and the water cooling channel closest thereto, which equalization chamber is configured to collect oil that has leaked out of the pressurized oil cooling channel.

10 Claims, 1 Drawing Sheet

(51) Int. Cl.
*H02K 9/193* (2006.01)
*H02K 9/197* (2006.01)

(56) References Cited

U.S. PATENT DOCUMENTS

| | | | |
|---|---|---|---|
| 2016/0006302 A1 | 1/2016 | Gugel et al. | |
| 2018/0331594 A1 | 11/2018 | Yagyu et al. | |
| 2020/0295628 A1* | 9/2020 | Reichert | H02K 5/203 |
| 2020/0395821 A1 | 12/2020 | Sakurada et al. | |
| 2021/0234434 A1 | 7/2021 | Lee et al. | |
| 2022/0006350 A1 | 1/2022 | Kang et al. | |

FOREIGN PATENT DOCUMENTS

| | | |
|---|---|---|
| JP | 2020-162338 A | 10/2020 |
| KR | 10-2020-0007293 A | 1/2020 |

OTHER PUBLICATIONS

German-language Written Opinion (PCT/ISA/237) issued in PCT Application No. PCT/EP2023/060389 dated Jul. 17, 2023 with English translation (9 pages).
German-language Search Report issued in German Application No. 10 2022 110 820.1 dated Mar. 10, 2023 with partial English translation (11 pages).

* cited by examiner

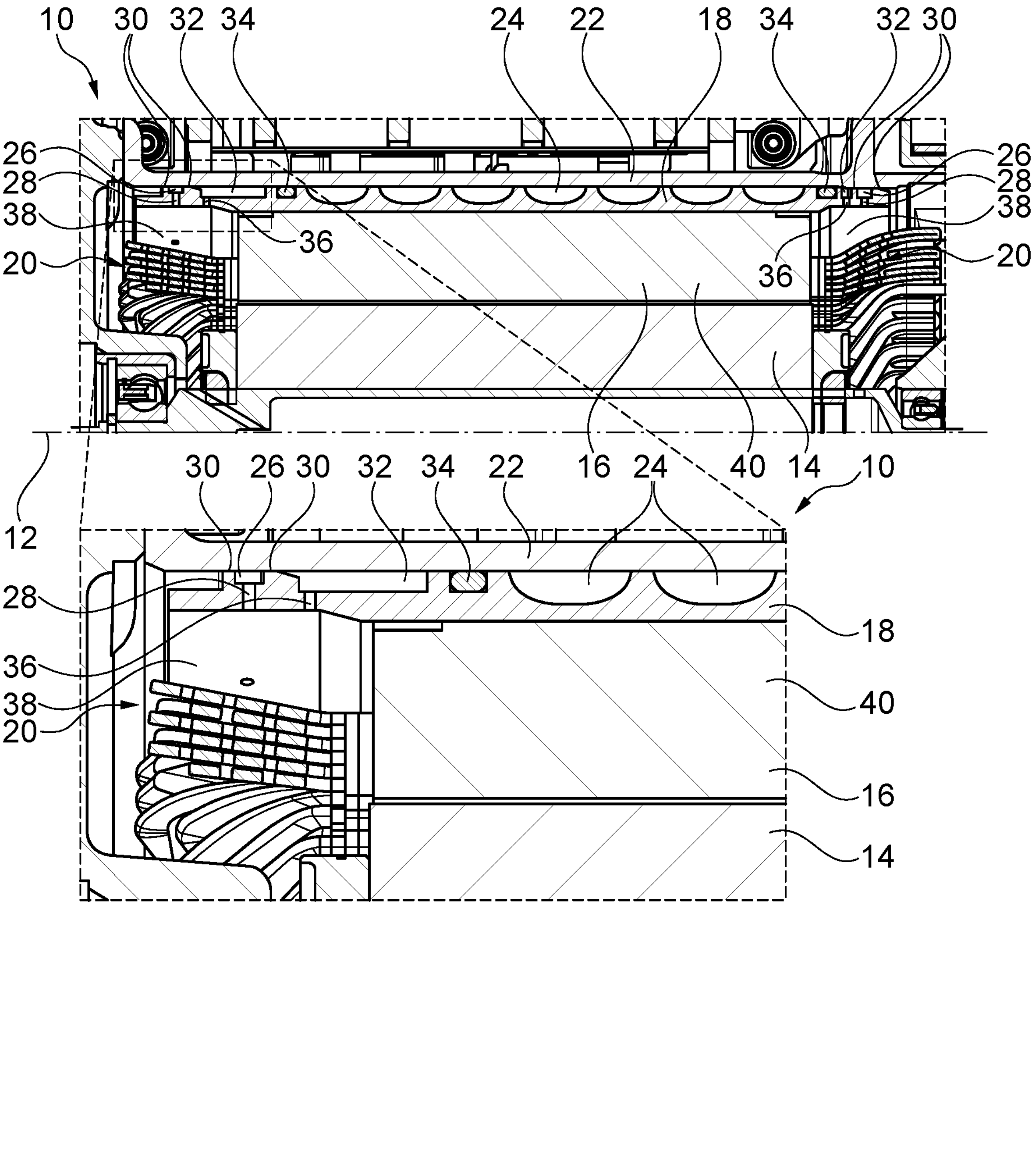
10
30
32
34
24
22
18
34
32
30
26
28
38
20
36
36
26
28
38
20
16
40
14
12
30
26
30
32
34
22
16
24
40
14
10
28
36
38
20
18
40
16
14

ELECTRIC TRACTION MACHINE FOR A MOTOR VEHICLE

BACKGROUND AND SUMMARY

The invention relates to an electric traction machine for a motor vehicle.

In the case of constricted installation space and weight conditions in motor vehicles, it may not be possible to implement already known embodiments of winding overhang cooling systems by external tubing or external distribution rings.

A stator cooling system for an electric machine is known from EP 2 975 734 B1. This discloses a cooling liquid line which is designed as a groove-shaped liquid channel running axially in an outer side of a laminated stator core. This groove-shaped liquid channel is sealed off from the outside by a motor housing surrounding the laminated stator core. The groove-shaped liquid channel serves, on the one hand, for the cooling of the laminated stator core in the form of a stator back cooling system, and also for heat dissipation to the adjacent motor housing, which is provided with cooling fins.

EP 2 109 207 B1 furthermore discloses an electric machine comprising a stator that has a stator winding. On opposite sides, the stator winding has a winding overhang arranged in a winding overhang space. In addition, the electric machine has a cooling device, which comprises a liquid cooling circuit with a stator jacket cooling system and cooling coils which are passed through the winding overhang spaces outside the winding overhang.

It is an object of the present invention to enable particularly simple and efficient cooling of a stator with a particularly small installation space requirement in an electric traction machine having the stator.

This object is achieved by the subject matter of the present disclosure. Further possible embodiments of the invention are disclosed in the description and the FIGURES.

The invention relates to an electric traction machine for a motor vehicle, having a rotor and a stator. The electric traction machine is configured to drive the motor vehicle by electric energy. The motor vehicle can thus be a hybrid vehicle or a pure electric vehicle. In order to avoid overheating of the electric traction machine during operation and thus a reduction in the power of the traction machine, it is envisaged that the electric traction machine, in particular at least the stator, is cooled. To implement this cooling of the stator, the electric traction machine has a stator sleeve, into which the stator is pressed. The stator sleeve is at least substantially tubular and surrounds the stator radially on the outside over the entire circumference of the stator in the installed position. In this context, the radial direction relates to the axis of rotation of the rotor of the electric traction machine.

By virtue of the fact that the stator is pressed into the stator sleeve, the circumferential outer surface of the stator rests in surface contact against the internal inner surface of the stator sleeve. Particularly good heat conduction from the stator to the stator sleeve is thereby ensured. The stator can thus release heat to the stator sleeve over its outer surface.

The electric traction machine furthermore comprises a housing, together with which the stator sleeve delimits at least one pressurized oil cooling channel and at least one water cooling channel. The pressurized oil cooling channel is configured to carry oil under pressure. The water cooling channel is configured to carry cooling water. A compensating chamber is kept free axially between the at least one pressurized oil cooling channel and the water cooling channel closest thereto, which compensating chamber is configured to collect oil that has emerged from the pressurized oil cooling channel. Jacket cooling of the stator sleeve takes place via the water cooling channel, with heat being absorbed by the stator sleeve by cooling water flowing in the water cooling channel. Thus, the stator can be cooled by the cooling water via the stator sleeve. By the pressurized oil cooling channel, it is possible, on the one hand, for the stator sleeve to be cooled and, on the other hand, for oil to be distributed within the electric traction machine, thereby enabling the oil to be fed selectively to a component to be cooled in the electric traction machine in order to cool this component of the traction machine.

The compensating chamber is arranged between the at least one water cooling channel and the pressurized oil cooling channel in the axial direction. In this context, the axial direction relates to the axis of rotation of the rotor. Through the provision of the compensating chamber, direct contact between oil flowing in the pressurized oil cooling channel and a boundary of the at least one water cooling channel is avoided. If oil emerges from the pressurized oil cooling channel, e.g. on account of a leak, this oil that has emerged is collected in the compensating chamber. By virtue of the collection of the oil in the compensating chamber, the oil that has emerged from the pressurized oil cooling channel is at a lower pressure than when flowing through the pressurized oil cooling channel. Thus, if the oil collected in the compensating chamber comes into contact with the boundary of the water cooling channel, it is possible to ensure that the oil is reliably kept away from the water cooling channel by the boundary. For this purpose, the at least one water cooling channel can be sealed off with respect to the compensating chamber by a sealing element. Thus, the sealing element comes into contact with the oil at most when it has been collected in the compensating chamber and is thus at a lower pressure than at a time at which the oil has flowed through the pressurized oil cooling channel. It is thereby possible to keep a pressure imposed on the sealing element of the water cooling channel by the oil particularly low and, as a result, to achieve a particularly high sealing effect of the sealing element. As a result, it is possible to keep a risk of contamination of cooling water flowing in the water cooling channel with oil that has emerged from the pressurized oil cooling channel particularly low. Such contamination of the cooling water with oil can lead to damage to the motor vehicle that has the electric traction machine. If the compensating chamber were not provided, the pressurized oil cooling channel would have to be at least double-sealed with respect to the at least one water cooling channel in order to avoid direct impingement of oil under pressure on the boundary of the water cooling channel. The compensating chamber thus makes it possible to eliminate the need for a double elastomer seal between the pressurized oil cooling channel and the water cooling channel. This double elastomer seal leads to particularly difficult assembly of the stator sleeve in the housing since the respective elastomer seals would have to rest both against the housing and against the stator sleeve and, as a result, particularly high frictional forces would occur between the stator sleeve and the housing as the stator sleeve was pushed into the housing.

The electric traction machine described is thus particularly simple to assemble and furthermore allows particularly good sealing of the at least one water cooling channel with respect to the at least one pressurized oil cooling channel. In the case of the electric traction machine, the at least one pressurized oil cooling channel, like the at least one water cooling channel, is integrated into the electric traction machine between the stator sleeve and the housing, thereby implementing cooling of the stator of the electric traction machine in a way that saves a particularly large amount of installation space.

In one possible further development of the invention, it is envisaged that the compensating chamber has at least one outflow opening, via which the collected oil can flow out of the compensating chamber. In this case, the compensating chamber has the at least one outflow opening, in particular, in a compensating chamber side wall facing a winding overhang of the stator. This enables the collected oil to flow out of the compensating chamber toward the winding overhang. As a result, the oil flowing out of the compensating chamber can then impinge upon the winding overhang, thereby enabling the winding overhang to be cooled by the oil. The at least one outflow opening thus enables the compensating chamber to be emptied, thereby avoiding a renewed pressure buildup of the oil in the compensating chamber and, on the other hand, enabling the oil to be fed to the winding overhang in order to cool the winding overhang. The outflow opening can be provided, for example, by a bore in a wall delimiting the compensating chamber.

In another possible embodiment of the invention, it is envisaged that the at least one water cooling channel is sealed off with respect to the compensating chamber by an elastomeric sealing element. The elastomeric sealing element allows particularly reliable sealing of the water cooling channel with respect to the compensating chamber, thereby making it possible to prevent oil from the compensating chamber entering the water cooling channel in a particularly effective manner. It is thereby possible to keep a risk of cooling water that is flowing in the water cooling channel from being contaminated with oil from the compensating chamber particularly low. On account of its elasticity, the elastomeric sealing element allows tolerance compensation between the stator sleeve and the housing. A gap between the stator sleeve and the housing is thereby reliably closed and thus sealed off by the elastomeric sealing element.

In another possible embodiment of the invention, it is envisaged that the at least one pressurized oil cooling channel is delimited with respect to the compensating chamber by a contact between the stator sleeve and the housing. This means that the stator sleeve directly touches the housing at the contact, thereby delimiting the pressurized oil cooling channel with respect to the compensating chamber. Despite the fact that the stator sleeve rests against the housing at the contact, leakage may occur via the contact, with oil flowing axially between the stator sleeve and the housing at the contact. This oil emerging from the pressurized oil cooling channel is collected by the compensating chamber. Because the compensating chamber is part of an oil-carrying region of the electric traction machine, and the compensating chamber is reliably sealed off with respect to the water cooling channel, there is no need for complete sealing of the pressurized oil cooling channel with respect to the compensating chamber. This allows particularly simple delimitation of the pressurized oil cooling channel by the contact between the stator sleeve and the housing. Complex sealing of the pressurized oil cooling channel with respect to the compensating chamber can thus be eliminated. The pressurized oil cooling channel can be delimited both with respect to the compensating chamber and with respect to a side axially opposite the compensating chamber by a respective contact between the stator sleeve and the housing.

In this context, it is envisaged, in another possible embodiment of the invention, that the stator sleeve and the housing are each formed from a metal, as a result of which the at least one pressurized oil cooling channel is delimited with respect to the compensating chamber by virtue of a metallic contact. For example, one metallic contact can delimit the pressurized oil cooling channel toward the front in the axial direction of the stator, and one metallic contact can delimit the pressurized oil cooling channel toward the rear in the axial direction of the stator. The respective metallic contacts between the stator sleeve and the housing give rise to only slight friction between the stator sleeve and the housing during insertion of the stator sleeve into the housing, and therefore the electric traction machine is particularly easy to assemble. This in turn allows particularly rapid assembly of the electric traction machine.

In another possible embodiment of the invention, it is envisaged that the stator sleeve is pressed into the housing. There is therefore a pressure joint between the stator sleeve and the housing in the electric traction machine. By virtue of the fact that the stator sleeve is pressed into the housing, the stator sleeve is fixed particularly securely relative to the housing. Unwanted relative movement between the stator sleeve and the housing during operation of the electric traction machine can thereby be avoided in a particularly reliable manner. Furthermore, the pressing of the stator sleeve into the housing has the effect that a gap between the stator sleeve and the housing is particularly small at the respective contacts and, as a result, only a particularly small amount of oil emerges axially as leakage from the pressurized oil cooling channel and has to be collected in the compensating chamber. A risk of a pressure buildup by the collected oil in the compensating chamber can thus be kept particularly low.

In another possible embodiment of the invention, it is envisaged that the electric traction machine is designed as a permanent synchronous machine. A permanent synchronous machine is an electric machine which develops relatively little heat during operation. As a result, water cooling of the electric traction machine with cooling water is possible. Water cooling of the stator by cooling water flowing in the at least one water cooling channel allows a particularly large heat output and thus particularly efficient cooling of the stator. This particularly efficient cooling of the stator allows, in turn, particularly efficient operation of the electric traction machine.

In another possible embodiment of the invention, it is envisaged that the at least one water cooling channel is arranged in such a way as to surround the stator radially at the circumference. The arrangement of the at least one water cooling channel around the circumference of the stator allows circumferential cooling of the stator via cooling water carried in the water cooling channel. The circumferential cooling of the stator enables heat to be dissipated from the stator via a particularly large surface of the stator, thereby making it possible to dissipate heat particularly quickly from the stator. Particularly efficient cooling of the stator is thereby made possible. The water cooling channel can extend in a helix around the stator in the axial direction of the stator, for example. This leads to a particularly large heat exchange area between the at least one water cooling channel and the stator sleeve and thus to particularly good heat transfer from the stator sleeve to the cooling water, thereby in turn allowing particularly good cooling of the stator resting against the stator sleeve.

In another possible embodiment of the invention, it is envisaged that the pressurized oil cooling channel is arranged in such a way as to surround a winding overhang of the stator radially at the circumference and has at least one bore, via which oil can emerge from the pressurized oil cooling channel onto the winding overhang. In particular, the pressurized oil cooling channel can have a plurality of bores which are distributed over the circumference of the stator, in particular uniformly, and via each of which oil can emerge from the pressurized oil cooling channel and flow or spray out onto the winding overhang. Thus, the pressurized oil cooling channel can extend at least substantially in a ring shape around the winding overhang, thereby enabling the oil in the pressurized oil cooling channel to be distributed at least substantially uniformly around the winding overhang. In the case of a regular arrangement of the plurality of bores around the winding overhang, the winding overhang can be cooled particularly uniformly by oil spraying out of the pressurized oil cooling channel. In a space in the electric traction machine in which the winding overhang is arranged, the prevailing pressure is lower than in the pressurized oil cooling channel. As the oil emerges from the pressurized oil cooling channel via the at least one bore, the pressure acting on the oil falls, as a result of which the oil is accelerated as it flows out of the pressurized oil cooling channel via the bore and is thus sprayed out. In this case, the at least one bore can act as a nozzle. The nozzle effect of the at least one bore can lead to atomization of the oil that is emerging from the pressurized oil cooling channel and is being sprayed in the direction of the winding overhang, thereby enabling uniform wetting and thus uniform cooling of the winding overhang by the oil.

In this context, it may be envisaged, in a further development of the invention, that the stator has a winding overhang at each of mutually opposite ends, and at least one pressurized oil cooling channel is provided for each winding overhang, wherein one of the pressurized oil cooling channels is arranged in front of the at least one water cooling channel and the other pressurized oil cooling channel is arranged behind the at least one water cooling channel in the axial direction of the stator. A respective compensating chamber is provided between each of the pressurized oil cooling channels and the water cooling channel, or a respective closest water cooling channel in the case of a plurality of water cooling channels, in order to avoid direct impingement of oil from the pressurized oil cooling channels on the boundary of the water cooling channel or the respective water cooling channels. The provision of a pressurized oil cooling channel for each of the winding overhangs of the stator makes it possible to enable efficient cooling of the winding overhangs of the stator and thus particularly uniform cooling of the stator. As a result, the electric traction machine can be operated in a particularly energy-efficient manner and at a particularly high power.

Further features of the invention can be obtained from the claims, the figures and the description of the figures. The features and combinations of features mentioned above in the description and the features and combinations of features mentioned below in the description of the figures and/or shown only in the FIGURES can be used not only in the respectively specified combination but also in other combinations or in isolation without exceeding the scope of the invention.

BRIEF DESCRIPTION OF THE DRAWING

FIG. 1 shows a schematic sectioned view of part of an electric traction machine having a housing, in which a rotor and a stator are arranged, wherein the stator is pressed into a stator sleeve and wherein the stator sleeve, together with the housing, has a water cooling channel as well as a first pressurized oil cooling channel, which is arranged in front of the water cooling channel in the axial direction, and a second pressurized oil cooling channel, which is arranged behind the water cooling channel in the axial direction, and a compensating chamber is in each case arranged between the water cooling channel and the respective pressurized oil cooling channels in the axial direction, which compensating chamber is configured to collect oil that has emerged from the respective pressurized oil cooling channels.

DETAILED DESCRIPTION OF THE DRAWING

FIG. 1 shows part of an electric traction machine 10 in a longitudinal section along an axis of rotation 12 of a rotor 14 of the electric traction machine 10. Here, a detail of the sectioned electric traction machine 10 is shown on an enlarged scale. In the present case, the traction machine 10 is a permanent synchronous machine. The electric traction machine 10 is provided for the purpose of driving an electrically operated motor vehicle. For this purpose, the traction machine 10 comprises the rotor 14 and a stator 16, relative to which the rotor 14 can be rotated around the axis of rotation 12. The traction machine 10 furthermore comprises a cylindrical stator sleeve 18, into which the stator 16 is pressed. The stator sleeve 18 thus surrounds the stator 16 at the circumference, radially on the outside relative to the axis of rotation 12. The stator sleeve 18 rests by its inner surfaces in surface contact with the outer surface of the stator 16, as a result of which there is a particularly large contact area between the stator sleeve 18 and the stator 16. Via this contact area, heat can be conducted away from the stator 16 to the stator sleeve 18, thereby cooling the stator 16. In the present case, the stator sleeve 18 projects beyond a laminated core 40 of the stator 16 in the axial direction both at the front and at the rear. The stator sleeve 18 thereby overlaps winding overhangs 20, arranged at respective ends of the stator 16, radially on the outside at the circumference, at least in one region of the axial length. The laminated core 40 of the stator 16 is pressed into the stator sleeve 18 by thermal fitting. The stator sleeve 18 serves to stabilize the laminated core 40, in particular during the operation of the traction machine 10.

The electric traction machine 10 furthermore comprises a housing 22, which, in the present case, surrounds the stator sleeve 18 radially on the outside at the circumference over its entire length along the axis of rotation 12. The stator sleeve 18 is pressed into the housing 22. In the present case, the stator sleeve 18, together with the housing 22, delimits a water cooling channel 24, in which cooling water is carried during operation of the traction machine 10, as well as two pressurized oil cooling channels 26, in which oil is carried during operation of the traction machine 10. In the present case, the stator sleeve 18 has a plurality of recesses or grooves on its outer surface arranged radially on the outside, which recesses or grooves define respective paths of the water cooling channel 24 and of the pressurized oil cooling channels 26. The water cooling channel 24 can extend over the outer surface of the stator sleeve 18, winding helically around the axis of rotation 12. Thus, the water cooling channel 24 can wind spirally along the outer lateral surface of the stator sleeve 18. The respective pressurized oil cooling channels 26 each extend over the circumference of the stator sleeve 18 in a ring shape around the axis of rotation 12. In the present case, a first one of the pressurized oil cooling channels 26 is arranged in front of the water cooling channel 24 in the axial direction of the traction machine 10, and the other pressurized oil cooling channel 26 is arranged behind the water cooling channel 24 in the axial direction of the traction machine 10. As a result, the respective pressurized oil cooling channels 26 run in a ring shape around the respectively associated winding overhangs 20. In the region of the respective pressurized oil cooling channels 26, the stator sleeve 18 has a plurality of bores 28, by which oil can emerge from the respective pressurized oil cooling channels 26 and flow out onto the associated winding overhang 20 radially surrounded by this pressurized oil cooling channel 26. By the oil emerging from the pressurized oil cooling channels 26 and impinging on the respective winding overhangs 20, the winding overhangs 20 are cooled during the operation of the traction machine 10.

To delimit the respective pressurized oil cooling channels 26, the stator sleeve 18 is brought into contact with the housing 22 axially in front and axially behind the respective pressurized oil cooling channel 26. In the present case, both the stator sleeve 18 and the housing 22 are formed from a metal, and therefore the respective pressurized oil cooling channels 26 are delimited by respective metallic contacts 30 between the stator sleeve 18 and the housing 22. Leakage of the oil from the pressurized oil cooling channel 26 can occur via these metallic contacts 30 between the stator sleeve 18 and the housing 22.

If the cooling water flowing in the water cooling channel 24 is contaminated with oil, oil gets into a water cooling circuit of the motor vehicle, as a result of which a vehicle cooling system of the motor vehicle may fail. In order to avoid contamination of cooling water flowing in the water cooling channel 24 with oil, a compensating chamber 32 is arranged between the water cooling channel 24 and each of the pressurized oil cooling channels 26 in the axial direction. In the present case, this compensating chamber 32 is of annular design and extends once around the stator sleeve 18 in the circumferential direction of the stator sleeve 18. The geometry of the compensating chamber 32 is defined by a groove in the stator sleeve 18 and the chamber is delimited by the stator sleeve 18 and the housing 22 on radially opposite sides. The respective compensating chambers 32 are each delimited with respect to the associated pressurized oil cooling channel 26 by a metallic contact 30, and sealed off with respect to the water cooling channel 24 by an elastomeric sealing element 34. The elastomeric sealing element 34 is thus arranged axially between the water cooling channel 24 and the respective compensating chamber 32. Oil from the respective pressurized oil cooling channel 26 which flows axially in the direction of the water cooling channel 24 via the metallic contact 30 is thus collected in the respective compensating chamber 32 arranged axially between the pressurized oil cooling channel 26 and the water cooling channel 24. The pressure prevailing in the respective compensating chamber 32 is lower than in the respective pressurized oil cooling channels 26, ensuring that the respective elastomeric sealing element 34 reliably seals off the water cooling channel 24 from the oil collected in the compensating chamber 32. In order to avoid a pressure buildup of the oil in the compensating chamber 32 as the oil level rises, an outflow opening 36, via which oil collected in the compensating chamber 32 can flow out, is provided for each of the compensating chambers 32. In the present case, the stator sleeve 18 has the outflow opening 36, which extends through the stator sleeve 18 in the radial direction. As a result, the oil collected in the respective compensating chamber 32 can flow out of the compensating chamber 32 toward the axis of rotation 12, in particular can flow onto the respective associated winding overhang 20. The respective winding overhang 20 can thereby be cooled by the oil flowing out of the respective compensating chambers 32. The respective winding overhangs 20 are arranged in what is referred to as an unpressurized oil space 38, in which the prevailing pressure is lower than in the respective pressurized oil cooling channels 26. The pressure prevailing in the compensating chamber 32, as in the unpressurized oil space 38, is lower than in the respective pressurized oil cooling channels 26.

In the present case, the respective pressurized oil cooling channels 26 and the respective compensating chambers 32 are formed by respective grooves on the outside of the stator sleeve 18. It is furthermore possible for the water cooling channel 24 to be formed by a groove that winds helically around the axis of rotation 12.

The present disclosure is based on the insight that, in the case of constricted installation space situations and weight targets, it is not always possible to implement winding overhang cooling systems by external tubing or external distribution rings. Owing to high requirements in respect of media sealing between the cooling water and oil when sealing is provided only by elastomeric sealing elements, direct integration of pressurized oil distribution grooves into a water-cooled stator support, in the present case the stator sleeve 18, can only be accomplished by double sealing of the respective pressurized oil cooling channel 26 with respect to the water cooling channel 24. Based on the integration of the winding overhang cooling system on both sides of the stator sleeve 18, a total of six elastomeric sealing elements would thus be necessary, each sealing the stator sleeve 18 against the housing 22, in order to seal off the respective pressurized oil cooling channels 26 toward the front and rear in the axial direction and additionally to seal off the water cooling channel 24 toward the front and rear in the axial direction, so that in each case two elastomeric sealing elements are arranged between the respective pressurized oil cooling channels 26 and the water cooling channel 24. These two elastomeric sealing elements between the respective pressurized oil cooling channel 26 and the water cooling channel 24 in the axial direction are necessary in order to avoid direct impingement of the oil on the elastomeric sealing element 34 directly sealing off the water cooling channel 24. On account of assembly requirements, especially in respect of fitting forces, fitting more than four elastomeric sealing elements when pushing the stator sleeve 18 into the housing 22 is virtually impossible or is possible only with the expenditure of a particularly high force.

In the case of the traction machine 10 shown in FIG. 1, the respective pressurized oil cooling channel 26 is separated from the water cooling channel 24 by a metallic contact 30. In addition, there is a separation between a pressurized oil sealing surface and the elastomeric sealing element 34 by the respective compensating chamber 32. The compensating chamber 32 serves to receive oil when there is a permissible leakage of the metallic contact 30 of the respective pressurized oil cooling channel 26. A pressure buildup of the oil collected in the respective compensating chamber 32 is prevented by outflow openings 36 between the respective compensating chambers 32 and the unpressurized oil space 38, and therefore a second elastomeric sealing element between the compensating chamber 32 and the water cooling channel 24 in the axial direction is obsolete. A leak between the respective pressurized oil cooling channels 26 and the unpressurized oil space 38 is permissible.

Sealing of the respective pressurized oil cooling channel 26 is performed by the metallic contacts 30 between the stator sleeve 18 and the housing 22, thereby enabling an oil volume flow of the oil to be deliberately passed via the radial bores 28 to the respective winding overhang 20. A possible oil pressure buildup at the elastomeric sealing element 34 by which the water cooling channel 24 is sealed off on account of a leak at the metallic contact 30 is prevented by the respective compensating chamber 32, which is arranged between the respective pressurized oil cooling channel 26 and the water cooling channel 24 in the axial direction and has the at least one outflow opening 36. Thus, direct impingement of pressurized oil on the sealing element 34 sealing off the water cooling channel 24 is avoided, and provision of an additional elastomeric sealing element is obsolete.

Overall, the present disclosure shows how an integrated seal-free winding overhang cooling system can be provided in a stator support, in the present case the stator sleeve 18.

LIST OF REFERENCE SIGNS

10 traction machine
12 axis of rotation
14 rotor
16 stator
18 stator sleeve
20 winding overhang
22 housing
24 water cooling channel
26 pressurized oil cooling channel
28 bore
30 contact
32 compensating chamber
34 elastomeric sealing element
36 outflow opening
38 unpressurized oil space
40 laminated core

The invention claimed is:

1. An electric traction machine for a motor vehicle, comprising:

a rotor;

a stator;

a stator sleeve, into which the stator is pressed; and a housing, together with which the stator sleeve delimits at least one pressurized oil cooling channel and at least one water cooling channel, wherein a compensating chamber is kept free axially between the at least one pressurized oil cooling channel and the water cooling channel closest thereto, which compensating chamber is configured to collect oil that has emerged from the pressurized oil cooling channel.

2. The electric traction machine according to claim 1, wherein the compensating chamber has at least one outflow opening configured to allow the collected oil to flow out of the compensating chamber.

3. The electric traction machine according to claim 1, wherein the at least one water cooling channel is sealed off with respect to the compensating chamber by an elastomeric sealing element.

4. The electric traction machine according to claim 1, wherein the at least one pressurized oil cooling channel is delimited with respect to the compensating chamber by a contact between the stator sleeve and the housing.

5. The electric traction machine according to claim 4, wherein the stator sleeve and the housing are each formed from a metal, as a result of which the at least one pressurized oil cooling channel is delimited with respect to the compensating chamber by the contact which is metallic.

6. The electric traction machine according to claim 1, wherein the stator sleeve is pressed into the housing.

7. The electric traction machine according to claim 1, wherein the electric traction machine is a permanent synchronous machine.

8. The electric traction machine according to claim 1 wherein the at least one water cooling channel is arranged such that it surrounds the stator radially at a circumference.

9. The electric traction machine according to claim 1, wherein the pressurized oil cooling channel is arranged such that it surrounds a winding overhang of the stator radially at a circumference, and has at least one bore configured to allow oil to emerge from the pressurized oil cooling channel onto the winding overhang.

10. The electric traction machine according to claim 9, wherein the stator comprises a winding overhang at each of mutually opposite ends, and at least one pressurized oil cooling channel is provided for each winding overhang, wherein one of the pressurized oil cooling channels is arranged in front of the at least one water cooling channel and another pressurized oil cooling channel is arranged behind the at least one water cooling channel in an axial direction of the stator.

* * * * *